United States Patent [19]

Iwagami

[11] Patent Number: 4,546,363

[45] Date of Patent: Oct. 8, 1985

[54] NOZZLE CLEANING DEVICE FOR AN INK JET SYSTEM PRINTER

[75] Inventor: Fusao Iwagami, Nara, Japan

[73] Assignee: Sharp Kabushiki Kaisha, Osaka, Japan

[21] Appl. No.: 623,919

[22] Filed: Jun. 25, 1984

[30] Foreign Application Priority Data

Jun. 29, 1983 [JP] Japan .......................... 58-102191[U]

[51] Int. Cl.[4] .............................................. G01D 15/18

[52] U.S. Cl. ............................ 346/140 R; 346/140 A

[58] Field of Search ..................... 346/140 IJ, 140 PD

[56] References Cited

U.S. PATENT DOCUMENTS 4,228,442 10/1980 Krull ............................ 346/140 PD 4,364,065 12/1982 Yamamori et al. .......... 346/140 PD 4,417,259 11/1983 Maeda .......................... 346/140 PD 4,479,136 10/1984 Lewis et al. ................. 346/140 PD

*Primary Examiner*—George H. Miller, Jr.

*Attorney, Agent, or Firm*—Birch, Stewart, Kolasch & Birch

[57] ABSTRACT

A nozzle cleaning device blows a cleaning solvent against the nozzle portion of a printer head in an ink jet system printer. The nozzle cleaning device includes an ejecting unit communicated to a cleaning solvent tank through a liquid supply passage. Th ejecting unit includes a plurality of orifices for emitting the cleaning solvent. A side passage is connected to the liquid supply passage. A cylinder is secured to the side passage, and a piston is slidably disposed in the cylinder. When the piston is moved in the cylinder, the cleaning solvent is introduced from the cleaning solvent tank into the cylinder, and then, the cleaning solvent is supplied from the cylinder to the ejecting unit. The amount of the cleaning solvent supplied to the ejecting unit is determined by the stroke of the piston in the cylinder.

3 Claims, 10 Drawing Figures

NOZZLE CLEANING DEVICE FOR AN INK JET SYSTEM PRINTER

BACKGROUND OF THE INVENTION

1. Field of the Invention

The present invention relates to a cleaning device for cleaning a nozzle in an ink jet system printer. The present invention relates, more particularly, to a cleaning device which blows cleaning solvent against the nozzle of an ink jet system printer, thereby removeing ink liquid and the dust attached to the nozzle portion of the ink jet system printer.

2. Description of the Prior Art

An ink jet system printer generally includes a nozzle unit for emitting ink droplets toward a record receiving paper. The nozzle unit includes at least one orifice through which the ink droplets are emitted. When the orifice is blocked by the dust or the solidified ink liquid, an accurate printing is not ensured. In an ink jet system printer of the ink-on-demand type, the distance between the recording paper and the nozzle surface is very short, for example, about 1 mm. Therefore, there is a great possibility that the ink mist scattered from the recording paper and the paper dust generated from the recording paper attach to the nozzle surface around the orifice. The dust attached to the nozzle surface around the orifice precludes an accurate printing operation.

A nozzle cleaning device has been proposed to clean the nozzle surface at a desired time. The nozzle cleaning device includes an emitting system for blowing the cleaning solvent against the nozzle surface. In the conventional cleaning device, the amount of the cleaning solvent ejected from the nozzle cleaning device is not properly controlled. Therefore, the cleaning is not ensured in the conventional system. Furthermore, in the conventional nozzle cleaning device, the position to which the cleaning solvent is ejected is manually controlled. Therefore, there is a possibility that the cleaning solvent is directly introduced into the inside of the nozzle unit through the orifice. The air may be introduced into the inside of the nozzle unit when the cleaning solvent is introduced into the inside of the nozzle unit. The air introduced into the inside of the nozzle unit precludes a stable operation of the ink jet system printer.

OBJECTS AND SUMMARY OF THE INVENTION

Accordingly, an object of the present invention is to provide a nozzle cleaning device for an ink jet system printer, which ensures a stable operation of the ink jet system printer.

Another object of the present invention is to provide a nozzle cleaning device which effectively removes the dust attached to the nozzle surface around the orifice.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, the amount of the cleaning solvent ejected from the nozzle cleaning device is controlled to be a predetermined value which ensures the cleaning of the nozzle surface. The nozzle cleaning device of the present invention is provided with a guide member so that the nozzle cleaning device confronts the printer head of an ink jet system printer at a desired position. In a desired position, the cleaning solvent ejected from the nozzle cleaning device is directed to a portion slightly above the orifice of the printer head. With the provision of the guide member, the cleaning operation is ensured, and the cleaning solvent will not be introduced into the inside of the nozzle unit included within the printer head.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
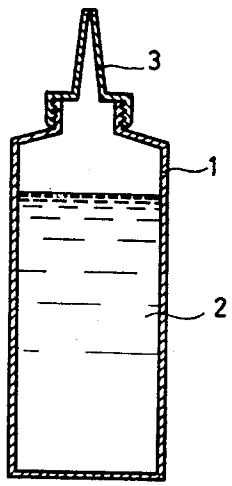
FIG.1 (PRIOR ART)
FIG. 1 is a sectional view of a nozzle cleaning device of the prior art.

FIG. 1 shows an example of the nozzle cleaning device of the prior art. The conventional nozzle cleaning device includes a polyethylene container 1 having an open upper end. Cleaning solvent 2 is disposed in the polyethylene container 1. A cap 3 having a tip end with a small opening is secured to the polyethylene container 1 at the open upper end thereof. When the polyethylene container 1 is gripped by a hand, the cleaning solvent 2 is ejected through the small opening formed in the tip end of the cap 3.

The amount of the cleaning solvent 2 ejected from the nozzle cleaning device of FIG. 1 varies depending on the depressing force manually applied to the polyethylene container 1. If the amount of the cleaning solvent 2 is not enough, the cleaning operation is not ensured. Furthermore, in the conventional nozzle cleaning device, the portion to which the cleaning solvent 2 is ejected is manually controlled. Therefore, there is a possibility that the cleaning solvent 2 is erroneously applied directly to the orifice of the ink jet system printer. The thus applied cleaning solvent 2 will function to introduce air into the inside of the printer head. If the air is introduced into the inside of the printer head, an accurate printing is not ensured.

Figure 2:
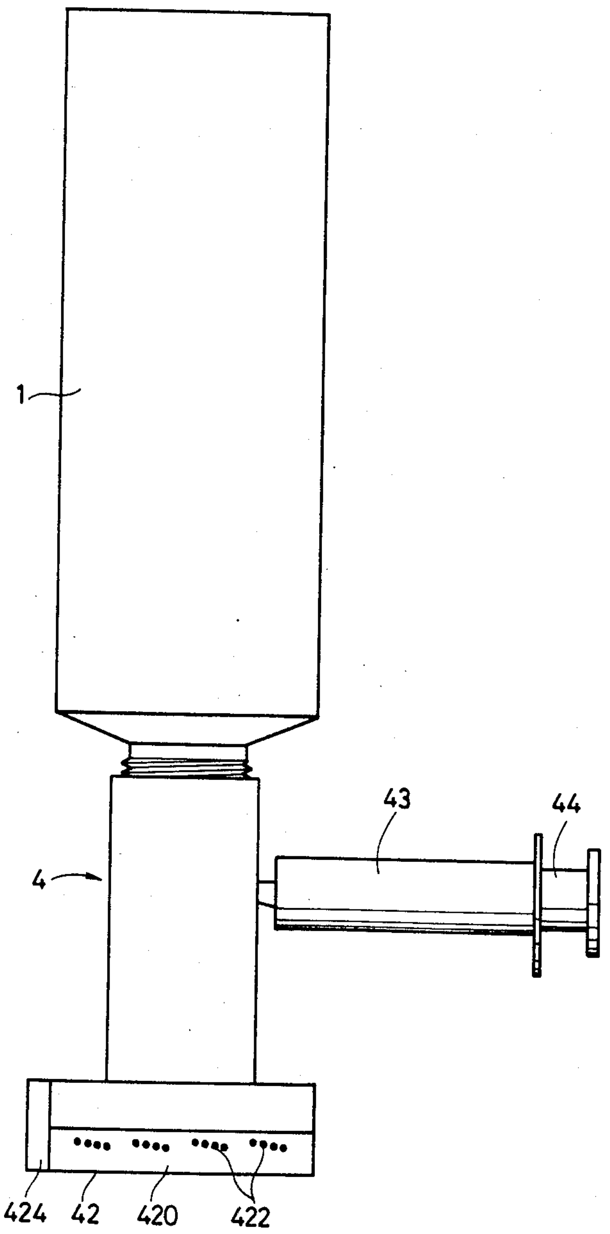
FIG. 2 is a front view of an embodiment of a nozzle cleaning device of the present invention.
Figure 3:
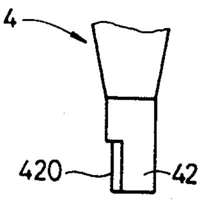
FIG. 3 is a side view of an essential part of the nozzle cleaning device of FIG. 2.
Figure 4:
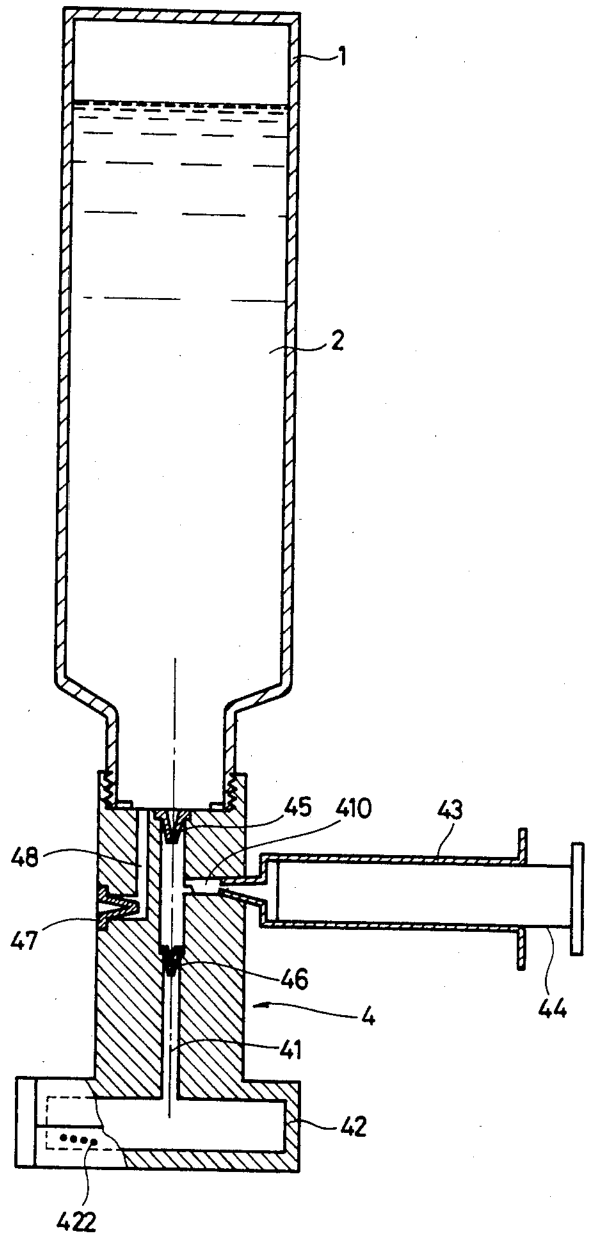
FIG. 4 is a sectional view of the nozzle cleaning device of FIG. 2.

FIGS. 2, 3 and 4 show an embodiment of a nozzle cleaning device of the present invention. A cleaning solvent tank 1 is a polyethylene container and contains the cleaning solvent 2 therein. An ejecting unit 4 is secured to a bottom free end of the cleaning solvent tank 1 in order to eject the cleaning solvent 2.

The ejecting unit 4 includes an ejecting head 42 for ejecting the cleaning solvent 2, and a liquid passage 41 for supplying the cleaning solvent 2 from the cleaning solvent tank 1 to the ejecting head 42. A side passage 410 is communicated with the liquid passage 41. A cylinder 43 is secured to the side passage 410. A piston 44 is disposed in the cylinder 43 in order to selectively introduce the cleaning solvent 2 into the cylinder 43 via the liquid passage 41 and the side passage 410. A first check valve 45 is disposed in the liquid passage 41 at the upstream of the side passage 410. A second check valve 46 is disposed in the liquid passage 41 at the downstream of the side passage 410. The first and second check valves 45 and 46 function, in combination, to ensure the stable supply of the cleaning solvent 2 from the cleaning solvent tank 1 to the ejecting head 42. An air intake passage 48 is formed in the ejecting unit 4 in order to introduce the air into the cleaning solvent tank 1, thereby ensuring the smooth flow of the cleaning solvent 2 from the cleaning solvent tank 1 to the ejecting unit 4. A third check valve 47 is disposed in the air intake passage 48 in order to prevent the leakage of the cleaning solvent 2 through the air intake passage 48.

The ejecting head 42 has, as shown in FIG. 3, a nozzle face 420 which is an indented surface. A plurality of orifices 422 are formed in the nozzle face 420 for ejecting the cleaning solvent 2. The orifices 422 are preferably formed in a manner to correspond to the ink droplet emitting orifices formed in the printer head of the ink jet system printer. An engaging guide 424 is provided at one edge of the ejecting head 42. The engaging guide 424 functions to precisely locate the nozzle cleaning device at a desired position in front of the printer head of the ink jet system printer.

Figure 5:
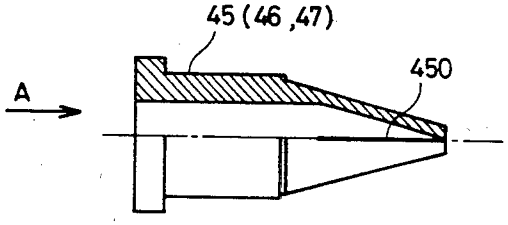
FIG. 5 is a partially sectional front view of a check valve included in the nozzle cleaning device of FIG. 2.
Figure 6:
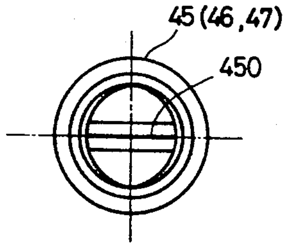
FIG. 6 is a side view of the check valve of FIG. 5.
Figure 7:
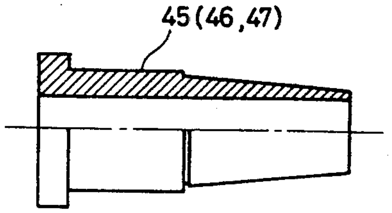
FIG. 7 is a partially sectional front view of the check valve of FIG. 5, showing an operational mode of the check valve.

FIGS. 5, 6 and 7 show the construction of the check valve 45 (46 or 47). The check valve 45 (46 or 47) is made of an elastic material such as rubber. The check valve 45 (46 or 47) has a cylinder shaped portion, and a tapered portion integral with the cylinder portion. The tip end of the tapered portion is closed in the normal condition as shown in FIG. 5. A slit 450 is formed in the tapered portion so that the check valve 45 (46 or 47) opens when the cleaning agent 2 or the air flows in the direction shown by the arrow A as shown in FIG. 7.

Figure 8:
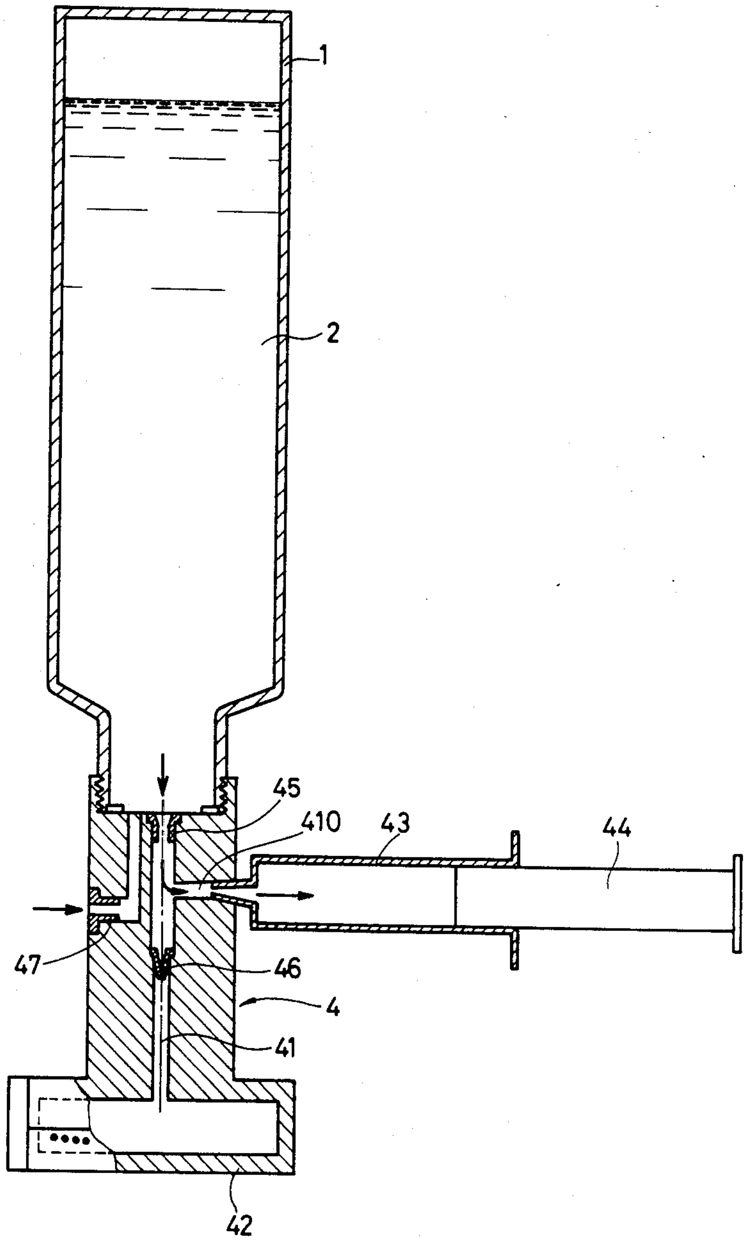
FIG. 8 is a sectional view of the nozzle cleaning device of FIG. 2, showing an operational mode of the nozzle cleaning device of FIG. 2.

When the piston 44 is pulled as shown in FIG. 8, the negative pressure is created in the cylinder 43. The first check valve 45 opens, and the second check valve 46 is maintained in the closed condition. Therefore, the cleaning solvent 2 is introduced from the cleaning solvent tank 1 to the cylinder 43. The amount of the cleaning solvent 2 introduced into the cylinder 43 is controlled by the stroke of the piston 44. As this moment, the negative pressure is also created in the cleaning solvent tank 1. The third check valve 47 opens to introduce air into the cleaning solvent tank 1, thereby ensuring the smooth supply of the cleaning solvent 2 from the cleaning solvent tank 1 to the cylinder 43.

When the piston 44 is pushed from the condition shown in FIG. 8, the first check valve 45 is closed, and the second check valve 46 is opened so that the cleaning solvent 2 is supplied from the cylinder 43 to the ejecting head 42 via the side passage 410 and the liquid passage 41. The cleaning solvent 2 is ejected from the orifices 422. The amount of the cleaning solvent 2 is ejected from the orifices 422 is determined by the stroke of the piston 44.

Figure 9:
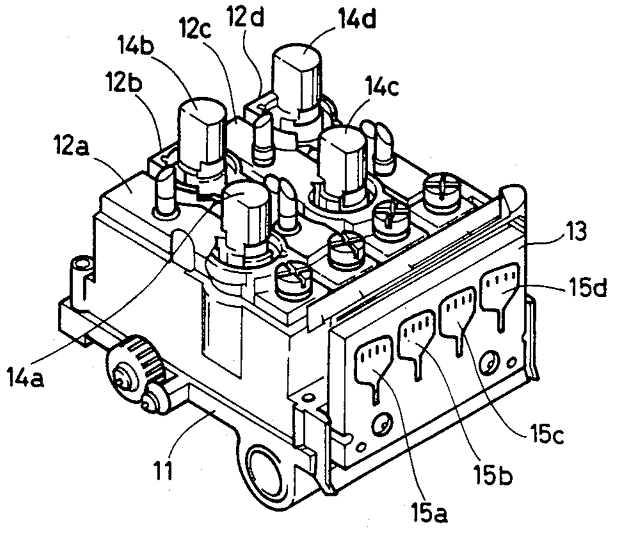
FIG. 9 is a perspective view of a printer head included in an ink jet system printer of the ink-on-demand type.

FIG. 9 shows an example of a printer head of an ink jet system printer of the ink-on-demand type, which has a plurality of orifices for emitting four color ink droplets. The printer head includes a carriage 11 which is driven to travel in front of the record receiving paper. Ink tanks **12*a*, 12*b*, 12*c* and 12*d* are mounted on the carriage 11. The ink tank 12*a* contains magneta ink, the ink tank 12*b* contains cyan ink, the ink tank 12*c* contains yellow ink, and the ink tank 12*d* contains black ink. A print head 13 is secured to the carriage 11 in a manner to confront the record receiving paper. The print head 13 includes four orifices 15*a* which are communicated with the ink tank 12*a* so as to emit magenta ink droplets therethrough, four orifices 15*b* communicated with the ink tank 12*b* for emitting cyan ink droplets, four orifices 15*c* communicated with the ink tank 12*c* for emitting yellow ink droplets, and four orifices 15*d* which are communicated with the ink tank 12*d* in order to develop black ink droplets. Ink cartridges 14*a*, 14*b*, 14*c* and 14*d* are removably secured to the ink tanks 12*a*, 12*b*, 12*c* and 12*d***, respectively.

Figure 10:
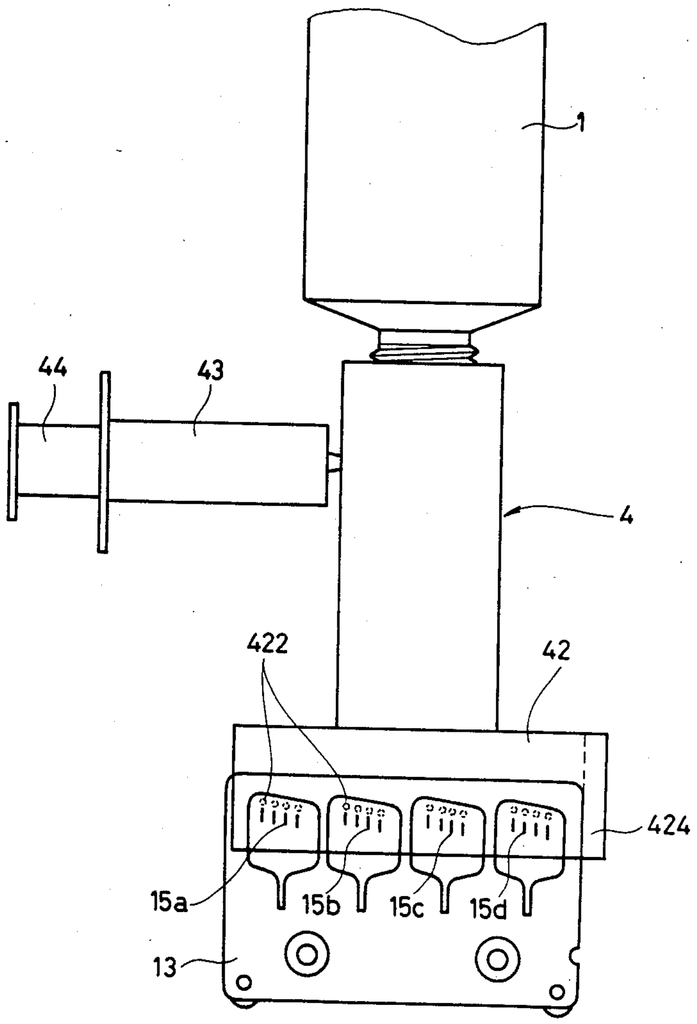
FIG. 10 is a schematic front view showing a condition where the nozzle cleaning device of FIG. 2 is set at the cleaning position in front of the printer head of FIG. 9.

The nozzle cleaning device of FIG. 2 includes the orifices 422 at the positions corresponding to each of the orifices **15*a*, 15*b*, 15*c* and 15*d*. The nozzle cleaning device of FIG. 2 is set in front of the print head 13 as shown in FIG. 10 at a desired time in order to clean the nozzle portion of the print head 13. More specifically, the nozzle face 420 of the nozzle cleaning device is fitted on the nozzle portion of the print head 13 by sliding the nozzle cleaning device through the use of the engaging guide 424. Each of the orifices 422 of the nozzle cleaning device is located slightly above the corresponding one of the orifices 15*a*, 15*b*, 15*c* and 15*d* as shown in FIG. 10. In a preferred form, each of the orifices 422 is positioned above the corresponding one of the orifices 15*a*, 15*b*, 15*c* and 15*d* by about 2 mm. This alignment precludes the cleaning solvent 2 ejected from the orifices 422 from being directly introduced into the inside of the print head 13 through the orifices 15*a*, 15*b*, 15*c* and 15*d***.

In a preferred form, the cleaning solvent tank 1 is reovably secured to the ejecting unit 4. If the cleaning solvent 2 is used up, the cleaning solvent tank 1 is exchanged by a new one.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A nozzle cleaning device for cleaning a print head of an ink jet system printer, comprising:

a cleaning solvent tank containing the cleaning solvent therein;

an ejecting unit including at least one orifice through which the cleaning solvent is ejected toward said print head;

liquid passage means for communicating said at least one orifice included in said ejecting unit with said cleaning solvent tank;

a cylinder communicated to said liquid passage means at a point in said liquid passage means;

a piston slidably disposed in said cylinder;

a first check valve disposed in said liquid passage means at a position between said point and said cleaning solvent tank; and a second check valve disposed in said liquid passage means at a position between said point and said ejecting unit, wherein said first and second check valves function, in combination, to ensure a stable supply of cleaning solvent from said cleaning solvent tank to said ejecting unit in response to the movement of said piston in said cylinder.

2. The nozzle cleaning device of claim 1, said ejecting unit comprising:

an intended surface having said at least one orifice formed therein; and a guide member formed at one edge of said indented surface so as to guide said ejecting unit at a desired position in front of said print head when the cleaning operation is conducted.

3. The nozzle cleaning device of claim 1, further comprising:

air passage means communicated with said cleaning solvent tank for introducing air into said cleaning solvent tank, thereby ensuring the smooth supply of the cleaning solvent from said cleaning solvent tank to said ejecting unit; and a third check valve disposed in said air passage means so as to prevent the leakage of said cleaning solvent via said air passage means.

* * * * *